UNITED STATES PATENT OFFICE.

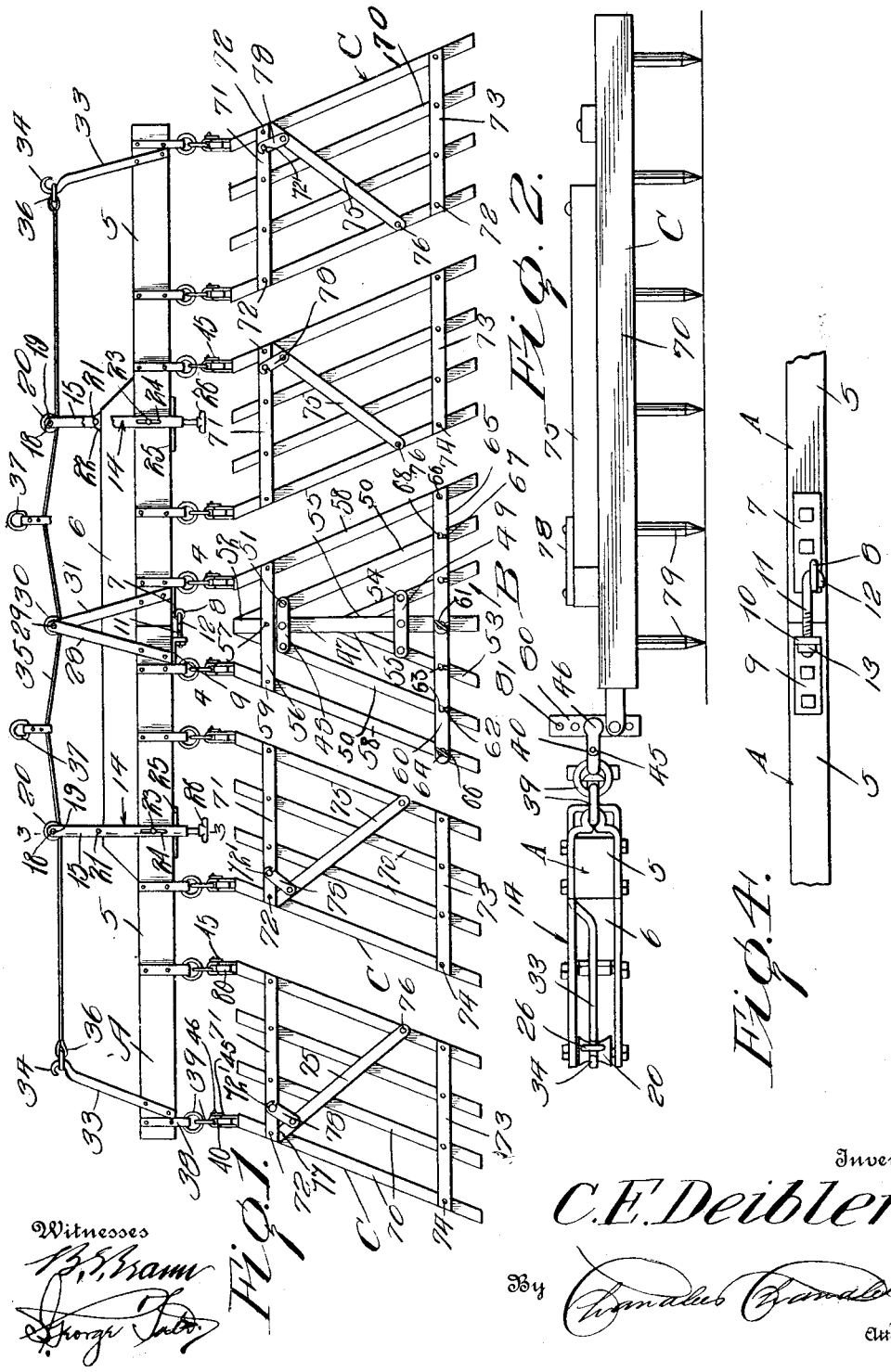

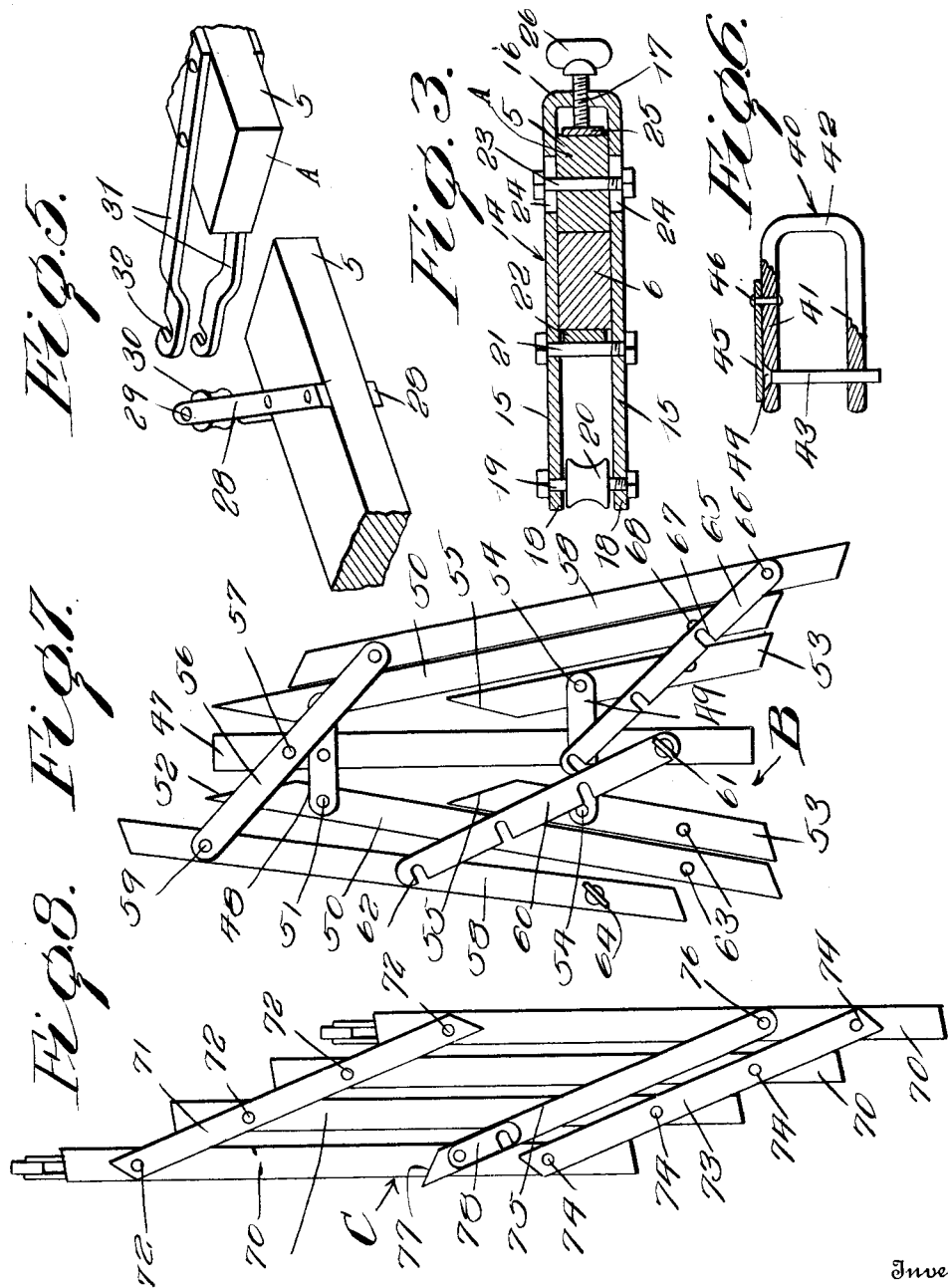

CHARLES E. DEIBLER, OF LAKEVILLE, MINNESOTA.

MULTIPLE HARROW.

1,130,579.  Specification of Letters Patent.  Patented Mar. 2, 1915.

Application filed September 19, 1912. Serial No. 721,259.

*To all whom it may concern:*

Be it known that I, CHARLES E. DEIBLER, a citizen of the United States, residing at Lakeville, in the county of Dakota, State of Minnesota, have invented certain new and useful Improvements in Multiple Harrows; and I do hereby declare the following to be a full, clear, and exact description of the invention, such as will enable others skilled in the art to which it appertains to make and use the same.

This invention relates to new and useful improvements in multiple harrows.

The principal object of the invention is to provide a plurality of separably collapsible harrows and a knock down draft bar to and from which said harrows are adapted to be attached and detached, whereby the harrows may be collapsed and the draft bar knocked down and superimposed upon the harrow so as to occupy but little space when not being used or when transporting the same.

Another object of the invention is to provide a sectional draft bar having a plurality of harrows which are so constructed that the sections may be readily assembled or disassembled.

A further object of the invention is to provide a harrow of the character described which is composed of a relatively few number of parts, is therefore simple in construction and is cheap to manufacture.

With these and other objects in view, the invention consists in the construction and novel combination of parts hereinafter fully described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

In the drawings: Figure 1 is a top plan view of a complete harrow constructed in accordance with my invention, Fig. 2 is an end elevation thereof, Fig. 3 is a detail cross sectional view taken on the line 3—3 of Fig. 1, Fig. 4 is a detail elevation showing the connection between the abutting ends of the main evener bar sections, Fig. 5 is a detail perspective view showing one of the means for locking the adjacent ends of the main draw bar sections together, Fig. 6 is an enlarged detail view, partly in section, of one of the clevises, Fig. 7 is a plan view of the center harrow section shown in its collapsed position, and Fig. 8 is a plan view of one of the end harrow sections, showing the same in its collapsed position.

Like reference numerals designate corresponding parts in all the figures of the drawings.

Referring to the drawings, A designates a sectional draw bar, and this bar includes a pair of main sections 5—5 and a front section 6, all of said sections being of substantially the same length. The front section 6 is disposed in advance of the main sections 5—5 and equally overlaps the inner ends of said main sections. Attached to the rear face of the inner end of one of the main sections 5 is a plate 7, and extending rearwardly from this plate is a horizontal eye 8. Attached to the rear face of the inner end of the other main section 5 is a plate 9, and this plate is formed with a vertical eye 10. A hook bolt 11 has its threaded shank disposed within the eye 10 and has its hook 12 engaged with the eye 8. A nut 13 is engaged with the threaded end of the shank and operates against the eye 10. As a result, upon manipulation of the nut 13, the sections 5—5 are drawn tightly together.

In order to detachably secure the main sections 5—5 and the front section 6 together, there is provided a pair of U-shaped clamps 14—14, each clamp being disposed transversely of the sections and arranged adjacent a respective end of the front section 6. Each clamp comprises a pair of spaced arms 15—15 and a connecting portion 16, the latter being centrally formed with a threaded opening 17. The connecting portion 16 is disposed in spaced relation to the rear face of a respective main section 5, and the arms 15 are of such lengths as to extend in advance of the front section 6, the extreme ends of the arms 15 being formed with eyes 18—18. A bolt 19 is disposed within the eyes 18 of the arms 15, and loosely mounted on this bolt is a grooved roller 20. Connecting the arms 15 directly in advance of the front section 6 is a vertical bolt 21, and this bolt is seated within a clip 22 carried by the front section 6. A vertical bolt 23 extends through an opening formed in a respective main section 5, and this bolt operates in slots 24—24 formed in the arms 15. A wear plate 25 is positioned against the rear face of a respective main section 5 and a tightening screw 26 operates in the threaded opening 17 and bears against the plate 25. It will thus be observed that upon rotation of the screw 26 in one direction, the clamp 14 will be drawn rearwardly, and as a result, the bolt 21 will be positioned within the clip 22. By means of the clip 22 all swinging movements of the clamp are prevented.

Secured to the inner end of one main section 5 are forwardly and inwardly inclined upper and lower arms 28—28, the front end of said arms extending in advance of the front section 6 and carrying a bolt 29. Loosely mounted upon this bolt is a grooved roller 30. Extending inwardly and forwardly from the inner end of the other main section 5 is a pair of spaced upper and lower arms 31—31, the forward ends of said arms terminating in hooks 32—32 adapted for engagement with the bolt 29 above and below the roller 30. Extending forwardly from the outer ends of the main sections 5 are hook arms 33—33, the forward end of each arm extending in an outwardly directed hook 34. A cable 35 operates in rear of and against the rollers 20—20 and 30, and has its ends provided with eyes 36—36 for engagement with the hooks 34. Rings 37—37 are suitably connected to the cable 35 on opposite sides of the pulley 30, and a draft element of any suitable construction (not shown) is adapted to be connected to these rings. Secured to the main sections 5 and extending rearwardly therefrom is a plurality of U-clips 38, and to each of these clips is connected one or more rings 39. Carried by the outer ring 39 is a clevis 40. This clevis is of U-shaped construction and includes spaced arms 41—41 and a connecting portion 42. A coupling pin 43 is mounted in suitable openings formed adjacent the free ends of the arms 41, and is formed with a countersunk head 44. A keeper 45 is pivotally connected, as at 46, to the arm 41 which receives the head 44, and this keeper is normally arranged to cover the head and thereby lock the pin 43 against accidental displacement.

My invention further comprises a plurality of harrow sections consisting of a center section B and a plurality of outer sections C, all of said sections being arranged in alinement and in rear of the draft bar A.

The center harrow section B comprises a main bar 47, and a pair of front and rear transverse spacing arms 48 and 49 are centrally connected to said bar intermediate its ends. A pair of forwardly converging side bars 50—50 are each pivotally connected adjacent its forward end, as at 51 to the respective end of the front spacing arm 48. The front end of each side bar 50 is beveled, as at 52, for engagement with the main bar 47. A pair of forwardly converging inner side bars 53—53 are each pivotally connected adjacent its forward end, as at 54, to the respective end of the rear spacing arm 49.

The front end of each inner side bar 53 is beveled, as at 55, for engagement with the main bar 47 centrally of its length. A lever 56 which is considerably longer than the front spacing arm 48 is pivotally connected, as at 57, centrally of its ends to the main bar 47 in advance of said arm 48. A pair of outer side bars 58—58 are each pivotally connected adjacent its forward end, as at 59, to the adjacent end of the lever 56. A latch bar 60 is pivotally connected at one end to the rear end of the main bar 47 by means of a winged bolt 61. This latch bar is formed with a plurality of inwardly extending slots 62 which are spaced equidistant from each other and are adapted to receive pins 63 that are respectively carried by the rear ends of the converging side bars 50 and 53 and with a winged nut 64 which is carried by the rear end of one outer side bar 58. A latch bar 65 which is similar in construction to the latch bar 60 is pivotally connected at one end, as at 66, to the rear end of the other side bar 58. The latch bar 65 is likewise formed with a plurality of inwardly extending slots 67 which are spaced equidistant apart for receiving pins 68 carried by the rear ends of the other inclined bars 50 and 53, and the slot 67 opposite the pivot 66 is adapted to receive the winged bolt 61. As a result of this construction the side bars 50, 53 and 58 are held in spaced and forwardly converging relations by means of the latch bars 60 and 65.

Each outer harrow section C is formed from a plurality of spaced parallel bars 70. A front link 71 is pivotally connected to the forward ends of the bars 70 by means of pivot bolts 72. A rear link 73 is pivotally connected to the rear ends of the bars 70 by means of pivot bolts 74. A brace 75 is pivotally connected at one end, as at 76, to the rear end of one of the outer bars 70 and in advance of the rear link 73. The free end of this brace is beveled, as at 77, for engagement with the rear edge of the front link 71 at a point diametrically opposite the pivot 76. A catch 78 is pivotally connected adjacent the free end of the brace 75 and is adapted when the bars are in their operative positions to be engaged with an adjacent bolt 72' and thereby lock the parts of the harrow against collapsing. Harrow teeth 79 are carried by each of the bars 70.

Secured to the forward ends of the outer side bars 58 of the center harrow section B, and to the forward ends of the outer bars 70 of each harrow section C, are draft bars 80. and each bar is formed with a series of spaced openings 81. The clevises 40 which are connected to the main sections 5 of the draw bar are connected to the draft bars 80 through any one of the openings 81 as will be readily understood.

From the foregoing, it will be observed that when it is desired to transport this implement, the harrow sections B and C are first disengaged from the sectional draw bar A. These harrow sections are then collapsed as shown in Figs. 7 and 8. The draw bar A can then be readily disassembled and the main sections 5 and the front sections 6 together with their attachments can then be readily positioned upon the harrow frames B and C. As a result, when the implement is arranged in this relation, it will occupy but very little space.

What is claimed is:

1. In an agricultural implement, a draw bar comprising in combination, a pair of main sections arranged end to end, a front section overlapping the inner ends of the main sections, and means for connecting all of said sections to form a unitary structure, said means comprising a pair of U-shaped clamps which are respectively disposed around the outer ends of the front section and the inner ends of the main sections, a transverse bolt carried by each clamp and operating against the front section, and an adjusting screw carried by each clamp and operating against the respective main section for drawing said clamp tightly to said sections.

2. In an agricultral implement, a draw bar comprising in combination, a pair of main sections arranged end to end, a front section overlapping the inner ends of the main sections, plates respectively secured to the rear faces of the inner ends of the main sections, one of said plates being bent rearwardly and formed with a threaded opening, an eye carried by the other plate, a hook bolt having its hook engaged in the eye and having its shank engaged in the opening, and a nut engageable with the shank and bearing against the first mentioned plate for locking said sections against longitudinal movement, and means connecting the main and front sections for preventing lateral movement therebetween.

In testimony whereof, I affix my signature, in presence of two witnesses.

CHARLES E. DEIBLER.

Witnesses:
MARGARET SORENSEN,
W. F. ROCHE.

Copies of this patent may be obtained for five cents each, by addressing the "Commissioner of Patents, Washington, D. C."